United States Patent [19]

Reott

[11] Patent Number: 4,822,663
[45] Date of Patent: Apr. 18, 1989

[54] CREASE RESISTANT LAMINATE

[75] Inventor: Gerald A. Reott, Mooresville, N.C.

[73] Assignee: Collins & Aikman Corporation, New York, N.Y.

[21] Appl. No.: 148,666

[22] Filed: Jan. 26, 1988

[51] Int. Cl.$^4$ .......................... B32B 3/26; B32B 7/04; B32B 31/00

[52] U.S. Cl. ...................................... 428/159; 156/85; 156/163; 156/229; 428/160; 428/198; 428/317.1

[58] Field of Search ............... 428/198, 152, 158, 159, 428/160, 229, 230, 231, 317.1, 317.7; 156/85, 161, 163, 164, 229, 291

[56] References Cited

U.S. PATENT DOCUMENTS

| 166,262 | 8/1875 | Corwin | 428/198 |
|---|---|---|---|
| 2,397,743 | 4/1946 | Kaphan | 428/198 |
| 2,816,054 | 12/1957 | Howden | 428/198 |
| 3,070,476 | 12/1962 | Miller | 428/160 |
| 3,257,263 | 6/1966 | Miller | 428/160 |
| 3,352,741 | 11/1967 | Miller | 428/160 |
| 3,360,423 | 12/1967 | Lindberg | 428/198 |
| 3,455,772 | 7/1969 | Mason et al. | 428/159 |
| 3,519,530 | 7/1970 | Struble, Jr. | 428/160 |
| 3,570,085 | 3/1971 | Heinemann | 428/227 |
| 3,666,595 | 5/1972 | Bauer | 428/198 |
| 3,687,797 | 8/1972 | Wideman | 428/198 |
| 3,755,062 | 8/1973 | Schirmer | 428/317.7 |
| 3,842,832 | 10/1974 | Wideman et al. | 428/317.7 |
| 4,716,069 | 12/1987 | Burke | 428/314.8 |

FOREIGN PATENT DOCUMENTS

| 3341028 | 5/1985 | Fed. Rep. of Germany | 428/159 |
|---|---|---|---|
| 2139704 | 1/1973 | France | 428/152 |

Primary Examiner—William J. Van Balen
Attorney, Agent, or Firm—Bell, Seltzer, Park & Gibson

[57] ABSTRACT

A laminate which is characterized by a resistance to creasing when the laminate is bent, comprising a foam layer having opposed substantially planar front and back surfaces, a surface layer contiguous with the substantially planar front surface of the foam layer and bonded thereto, and a backing layer having spaced apart discrete areas thereof bonded to the rear surface of the foam layer with portions of the backing layer located between the discrete areas extending outwardly in spaced apart relation from the rear surface of the foam layer to form a series of puckers in the backing layer.

22 Claims, 2 Drawing Sheets

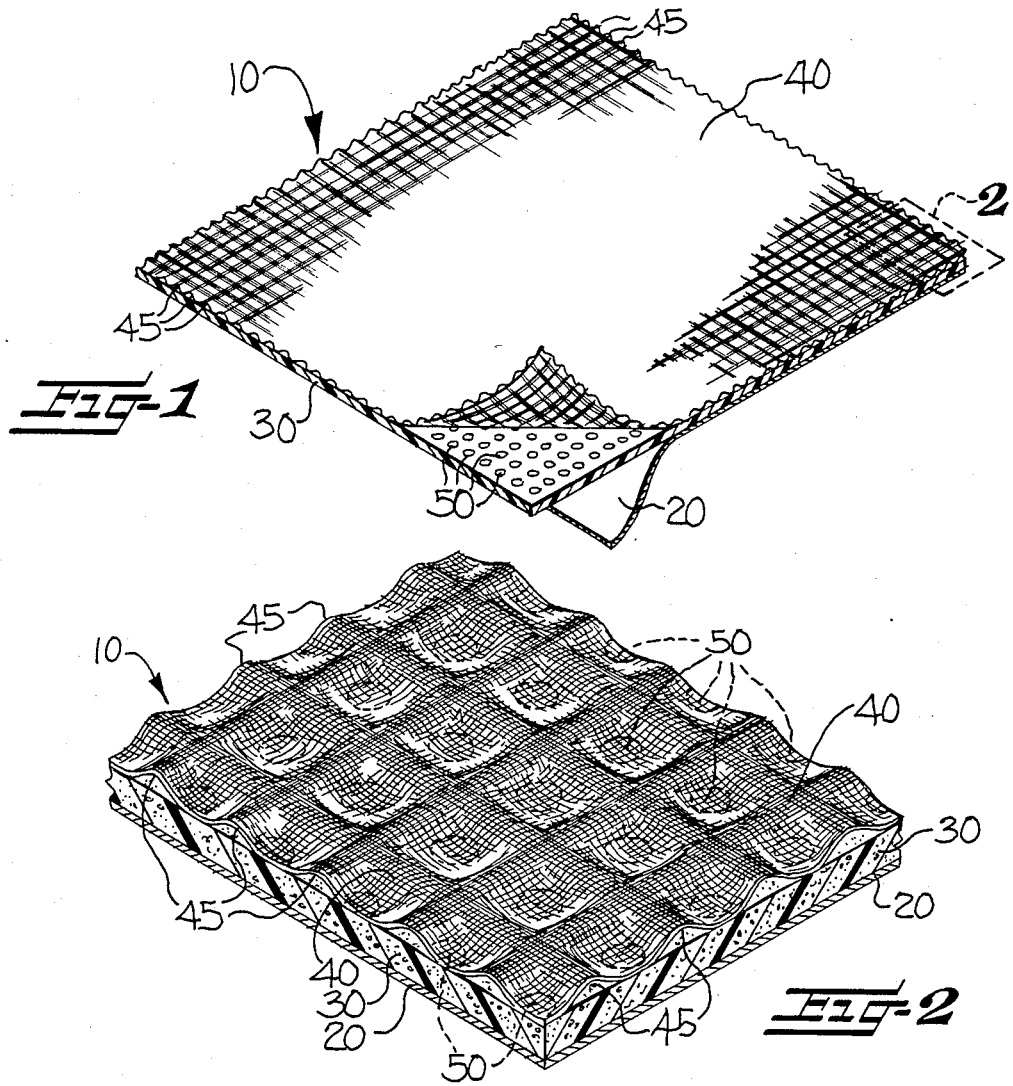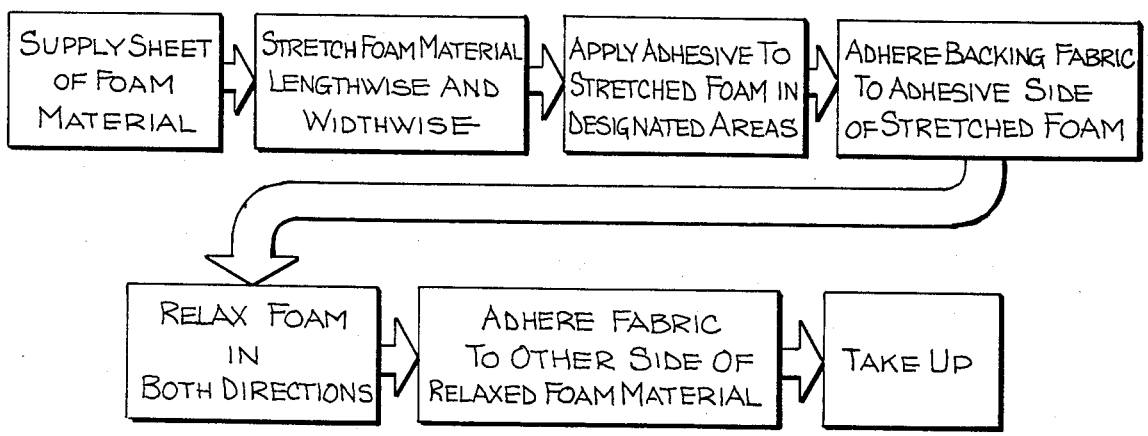

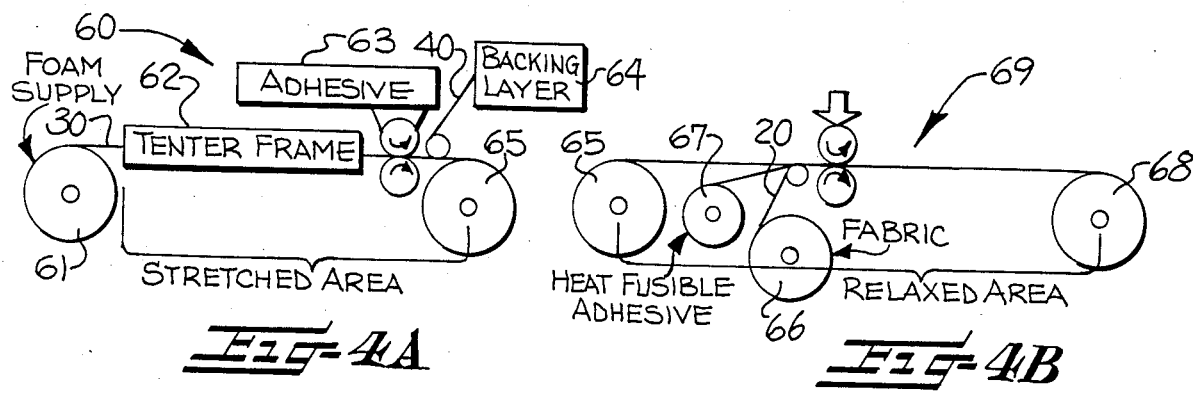
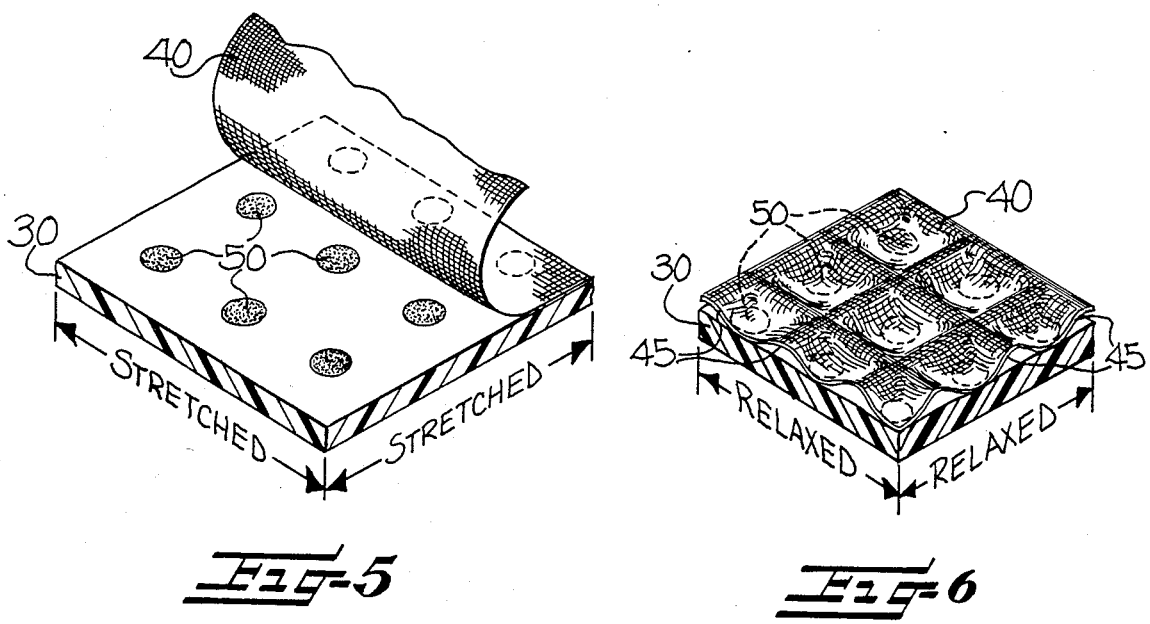
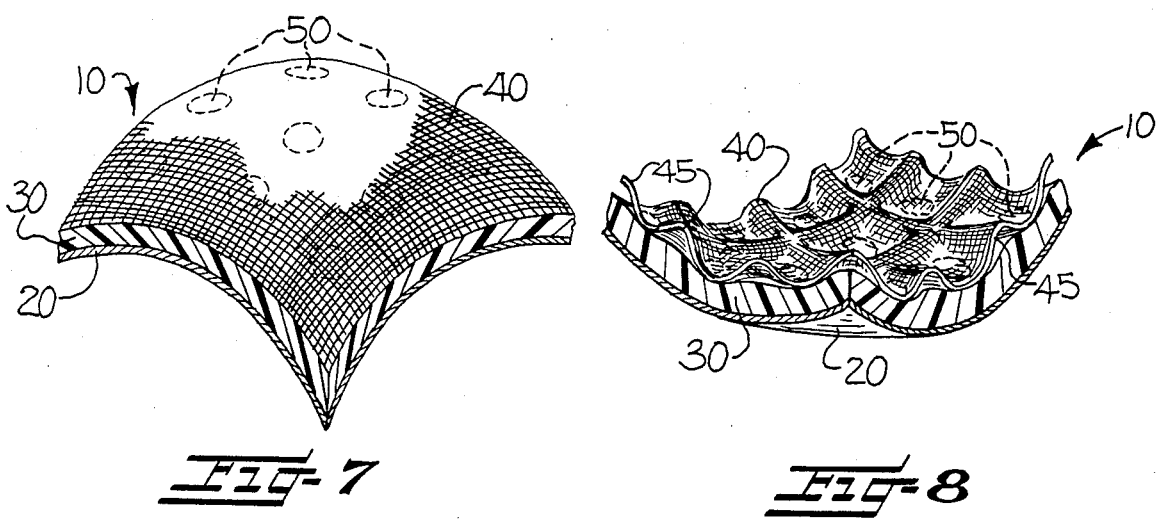

CREASE RESISTANT LAMINATE

FIELD AND BACKGROUND OF THE INVENTION

This invention relates to a laminate and its method of preparation. Particularly, this invention relates to a fabric and foam laminate which resists creasing when the fabric is bent.

Fabric and foam laminates are used in a number of upholstery applications, and in particular, in automobile upholstery. The laminate includes an outer upholstery fabric, an inner foam layer to provide cushioning, and usually also a rear fabric or scrim which facilitates securement of the laminate to an underlying substrate. One of the problems with fabric/foam laminates of this type is that they have limited flexibility, and tend to form undesirable creases when the fabric is bent or contoured. This tendency toward creasing significantly limits the number of uses of the laminates. Creasing is particularly a problem in upholstering the oddly shaped contours of an automobile such as the seats, headliners, door panels or arm portions thereof.

A prior attempt to solve this creasing problem in a fabric and foam laminate for upholstered furniture is disclosed in U.S. Pat. No. 3,360,423 to Lindberg. To increase the flexibility of the fabric/foam laminate, the backing sheet is adhered to the foam layer by a discontinuous, patterned adhesive layer. Thus, flexibility is improved when the fabric/foam laminate is bent in a direction away from the backing sheet, since the backing sheet is free to buckle. However, no improvement in flexibility is provided when the laminate is bent in the opposite direction.

The laminate of the present invention advantageously avoids creasing when bent in a direction either toward or away from the backing sheet. The laminate can be bent through relatively large angles, e.g. on the order of about 45 degrees, without creasing. Of primary significance is that these laminates are much more versatile and can be employed on a much wider range of contoured substrates.

SUMMARY OF THE INVENTION

The laminate of the present invention includes a foam layer having opposed substantially planar front and back surfaces, a surface layer contiguous with the substantially planar front surface of the foam layer and bonded thereto, and a backing layer having spaced apart discrete areas thereof bonded to the rear surface of the foam layer. The portions of the backing layer located between the discrete areas extend outwardly in spaced apart relation from the rear surface of the foam layer to form a series of puckers in the backing layer. The discontinuous pattern of adhesive helps prevent creasing when the laminate is flexed or bent in a direction toward the backing side, whereas the bi-directional puckers provide extra material in the backing layer so that the laminate can be bent in a direction away from the backing side without collapsing or creasing the foam layer.

The present invention also provides a method of preparing a laminate which resists creasing which includes the steps of applying a discontinuous pattern of adhesive to the rear surface of a foam layer, biaxially stretching the foam layer, bonding a backing layer to the adhesive patterned surface of the foam layer while maintaining the foam layer in its biaxially stretched condition, releasing the foam layer to return to its unstretched condition to cause portions of the backing layer located between the patterned bonded areas to extend outwardly in spaced apart relation from the rear surface of the foam layer to form a series of puckers in the backing layer, and bonding a surface layer to the front surface of the foam layer to form a laminate.

BRIEF DESCRIPTION OF THE DRAWINGS

Some of the objects and advantages of the present invention having been stated, others will appear as the description proceeds, when considered in conjunction with the accompanying drawings, in which FIG. 1 is an isometric view of a laminate of this invention, with one corner thereof being broken open to reveal the interior construction;

FIG. 2 is an enlarged detailed isometric view of a portion of the laminate identified as 2 in FIG. 1;

FIG. 3 is a diagrammatic representation of a method of producing a laminate in accordance with the invention;

FIGS. 4A and 4B are diagrammatic and schematic representations showing the method of producing the laminate;

FIG. 5 is a detailed isometric view of a foam layer and a backing layer of the laminate in a stretched condition;

FIG. 6 is a detailed isometric view of a foam layer and a backing layer of the laminate in a relaxed condition;

FIG. 7 is an isometric view illustrating the fabric laminate bent in a direction away from a backing layer; and FIG. 8 is an isometric view illustrating the laminate bent in a direction towards the backing layer.

DETAILED DESCRIPTION OF THE INVENTION

The present invention now will be described more fully hereinafter with reference to the accompanying drawings, in which a preferred embodiment of the invention is shown. This invention can, however, be embodied in many different forms and should not be construed as limited to the embodiment set forth herein; rather, applicant provides this embodiment so that this disclosure will be thorough and complete, and will fully convey the scope of the invention to those skilled in the art.

Referring now more particularly to the drawings, the laminate of the present invention is indicated generally by the reference character 10. As illustrated in the Figures, the laminate 10 has three basic components, namely a surface layer 20, a foam layer 30 and a backing layer 40. The surface layer or upholstery layer 20 may be a sheet or film, such as vinyl, or a woven, non-woven or knitted fabric, formed of natural fibers, synthetic fibers or blends thereof. Particularly desirable is a fabric construction which provides a pleasing hand to the surface layer and permits a plurality of patterns and grains to be incorporated therein for aesthetic appeal. Additionally, the surface layer may include adhesive fibers to bond this layer to the foam layer 30.

The foam layer 30 has opposed substantially planar front and back surfaces. Typical foams which can be utilized as the foam layer are open-cell foam sheet materials such as urethane polymers, polymers and copolymers of ethylene, propylene, isobutylene and vinyl chloride, with urethane polymers being preferred. The foam layer typically has a thickness of from about ¼ inch to about ¾ inch. The surface layer 20 is contiguous with the substantially planar front surface of the foam layer 30 and is bonded throughout and uniformly along its rear surface thereto. This bonding is accomplished by any suitable means. One particularly desirable method as illustrated is to apply a web of heat fusible adhesive material to the rear surface of the surface layer 20, wherein bonding is accomplished by applying heat to activate the adhesive material of the web. Alternatively, various conventional solvent based adhesives, water based adhesives, or heat activatable thermoplastic adhesives or adhesives powders can be employed. Adhesives based on styrene/butadiene, acrylic resins, polyvinyl alcohol, polyethylene, polyvinyl chloride and polyvinylidene chloride may be employed. Alternatively, heat fusible adhesive fibers may be included in the surface layer 20 and heat activated when bonding the surface layer and foam layer 30 together. Other known laminating techniques, such as flame laminating, can also be suitably employed.

The backing layer or scrim layer 40 may be formed of films or of woven, non-woven or knitted materials, preferably of a relatively open-mesh, lightweight construction. The backing layer 40 is bonded to the rear surface of the foam layer 30 in a discontinuous pattern by any suitable bonding means, such as a patterned adhesive applied to the foam layer. As shown in the Figures, this pattern comprises a plurality of uniformly sized dots 50 arranged in a two-dimensional uniform grid-like pattern or array over the rear surface of the foam layer. The dots typically have a diameter of from about ⅛ to ¾ inch and are preferably spaced apart a distance greater than the width of the dots 50. Thus for example, the adhesive dots may be about ⅜ inch in diameter and spaced apart about ½ to 1 inch. Any of a wide variety of commercially available adhesives may be suitably employed. Examples of suitable adhesives include commercially available thermoplastic adhesives based upon polyamides, polyesters, polyolefins, polyvinyl adhesives, etc. Also, solvent-based or waterbased adhesives, including those based on rubber or urethane compositions, may be employed.

The portions of the backing layer located between the dots of adhesive and not bonded to the foam layer, extend outwardly in spaced relation from the rear surface of the foam layer 30 and form a series of puckers 45 extending longitudinally and laterally in the backing layer. The combination of bi-directional puckers and discontinuous pattern of adhesive permits the laminate to be bent or flexed in a direction both away from and toward the backing layer without collapsing or creasing the foam. Specifically, the bi-directional puckers 45 provide extra material in the backing layer so that the laminate can be bent or flexed in a concave shape, i.e. in a direction away from the backing layer as shown in FIG. 7. When so bent or flexed, the excess material provided by the puckers is pulled taut, thus facilitating bending of the foam without causing the backing layer to collapse into the foam layer and creasing the laminate.

The patterned application of the adhesive between the backing layer and the foam also contributes to the bending properties of the laminate by allowing the backing layer material to pucker further when bent or flexed in a convex shape, i.e. toward the backing layer side as shown in FIG. 8 to enhance the bending properties in that direction.

Although puckered laminated fabrics are known in the art (U.S. Pat. Nos. 3,070,476, 3,257,263 and 3,352,741 being exemplary), there is no recognition that these puckered fabrics can be used for upholstery, and moreover, there is no disclosure that the puckers can be used to improve bending properties of the fabric.

The overall process for producing the laminate of this invention is shown in FIG. 3. Referring now to FIG. 4, a basic production line system is generally indicated by the reference numeral 60. The foam layer 30 is conveyed from a foam supply source roll 61 to a tenter frame assembly 62. The tenter frame assembly 62 stretches the foam layer longitudinally and laterally as shown in FIG. 5. While the foam is maintained in this biaxially stretched condition, a discontinuous pattern of adhesive is applied at an adhesive application station 63. The foam layer is next advanced to a station where a backing layer from a backing layer supply roll 64 is directed into contact with the adhesive coated and stretched foam layer to bond the backing layer to the foam layer. The foam layer is then released to permit it to return to its unstretched and relaxed condition, as shown in FIG. 6. This results in portions of the backing layer located between the patterned bonded areas to extend outwardly in spaced apart relation from the rear surface of the foam layer to form a series of puckers in the backing fabric. The foam layer/backing layer is taken up on a first take-up roll 65 and is transferred to a second conveyor line 69. A surface layer 20 is directed from a surface layer supply roll 66 while simultaneously a web of a heat fusible adhesive material from an adhesive supply roll 67 is applied to the rear surface of the foam layer and heated so as to bond the surface layer to the foam layer to form the laminate. The laminate is then taken up in roll form on a second take-up roll 68 in final prepartion for end use.

As is readily apparent, a laminate produced by the present method results in one which resists creasing through the bi-directional puckers and discontinuous pattern of adhesive when the laminate is bent. Such a laminate facilitates the installation thereof in a contoured environment, thereby increasing the versatility of such laminates.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A laminate comprising:
   a foam layer having opposed substantially planar front and back surfaces,
   a surface layer conforming to and overlying the substantially planar front surface of the foam layer and bonded thereto, and
   a backing layer having spaced apart discrete areas thereof bonded to the rear surface of the foam layer with portions of the backing layer located between the discrete areas extending outwardly in spaced apart relation from the rear surface of the foam layer to form a series of bi-directional puckers extending biaxially in the backing layer.

2. A laminate according to claim 1 wherein the spaced apart discrete bonded areas of the backing layer comprise a plurality of dots arranged in a two-dimensional pattern over the rear surface of the foam layer.

3. A laminate according to claim 2 wherein said dots are spaced apart from one another a distance greater than the width of the dots.

4. A laminate according to claim 2 wherein said dots are of substantially uniform size having a diameter of from about ⅛ to ¾ inch and are substantially uniformly spaced apart over the rear surface of the foam layer by a distance of from about ½ to 1 inch.

5. A laminate according to claim 1 wherein the surface layer is a fabric.

6. A laminate according to claim 1 wherein the surface layer is a film.

7. A laminate according to claim 1 wherein the backing layer is a woven fabric.

8. A laminate according to claim 1 wherein the foam layer comprises a polyurethane foam.

9. A laminate according to claim 8 wherein the foam layer is from about ¼ inch to about ¾ inch in thickness.

10. A laminate according to claim 1 wherein the surface layer is bonded throughout and uniformly along its rear surface to the front surface of the foam layer.

11. A laminate according to claim 10 wherein the surface layer is bonded throughout and uniformly along its rear surface to the front surface of the foam utilizing a web of heat fusible adhesive material applied to the rear surface of the surface layer.

12. A laminate comprising:
a foam layer having opposed substantially planar front and back surfaces,
a surface layer conforming to and overlying the substantially planar front surface of the foam layer and bonded thereto,
a discontinuous pattern of adhesive carried by the rear surface of the foam layer, and
a backing layer adhesively secured to the foam layer by the discontinuous pattern of adhesive at spaced apart discrete areas, with the portions of the backing layer located between the discrete areas extending outwardly in spaced apart relation from the rear surface to form a series of bi-directional puckers extending biaxially in the backing layer.

13. A laminate according to claim 12 wherein the discontinuous pattern of adhesive is in the form of a plurality uniformly sized spaced apart dots.

14. A laminate according to claim 13 wherein the dots of adhesive are arranged in a substantially uniformly spaced apart pattern, and the puckers in the backing layer form a substantially uniform waffle-form pattern.

15. A laminate according to claim 12 wherein the surface layer is a fabric.

16. A laminate according to claim 12 wherein the surface layer is a film.

17. A method of preparing a laminate which resists creasing when the laminate is bent, said method comprising:
providing a foam layer having opposed substantially planar front and rear surfaces,
applying a discontinuous pattern of adhesive to the rear surface of the foam layer,
biaxially stretching the foam layer,
bonding a backing layer to the adhesive patterned rear surface of the foam layer while maintaining the foam layer in its biaxially stretched condition,
releasing the foam layer to return to its unstretched condition to cause portions of the backing layer located between the patterned bonded areas to extend outwardly in spaced apart relation from the rear surface of the foam layer to form a series of bi-directional puckers extending biaxially in the backing layer, and
bonding a surface layer in overlying and conforming relation to the substantially planar front surface of the foam layer to form a laminate.

18. A method of preparing a laminate according to claim 17 wherein said step of applying a discontinuous pattern of adhesive is performed by applying a plurality of uniformly sized dots of adhesive in a spaced apart relation.

19. A method of preparing a laminate according to claim 17 wherein said step of bonding a surface layer to the front surface of the foam layer is performed by applying a web of heat fusible adhesive material to the rear surface of the surface layer, and subsequently heating the adhesive material to activate the bonding properties thereof.

20. A method of preparing a laminate which resists creasing when the laminate is bent, said method comprising:
conveying a supply of a foam layer having opposed substantially planar front and back surfaces to an adhesive application station while biaxially stretching the foam layer,
applying a discontinuous pattern of adhesive to the back surface of the foam layer at the adhesive applying station while maintaining the foam layer in its biaxially stretched condition,
directing a backing layer into contact with the adhesive coated back surface of the stretched foam layer and bonding the backing layer to the foam layer, releasing the foam layer to return to its unstretched condition to cause portions of the backing layer located between the patterned bonded areas to extend outwardly in spaced apart relation from the rear surface of the foam layer to form a series of bi-directional puckers extending biaxially in the backing layer,
directing a web of heat fusible adhesive material on the substantially planar front surface of the foam layer,
directing a surface layer onto the web of heat fusible adhesive material, and
activating the heat fusible adhesive material to bond the surface layer in overlying and conforming relation to the substantially planar back surface of the foam layer to form a laminate.

21. A laminate comprising:
a foam layer having opposed substantially planar front and back surfaces,
a surface layer formed of an upholstery fabric overlying and conforming to the substantially planar front surface of the foam layer and bonded substantially throughout along its rear surface to the front surface of the foam layer, and
a backing layer formed of a scrim fabric having spaced apart discrete areas bonded to the rear surface of the foam layer in a two-dimensional pattern over the rear surface of the foam layer, with portions of the backing layer located between the discrete areas extending outwardly in spaced apart relation from the rear surface of the foam layer to form bi-directional rows of puckers extending biaxially in the backing layer.

22. A laminate according to claim 21 wherein the surface layer is bonded throughout and uniformly along its rear surface to the front surface of the foam utilizing a web of heat fusible adhesive material applied to the rear surface of the surface layer.

* * * * *